US011362943B2

(12) United States Patent
Momchilov et al.

(10) Patent No.: US 11,362,943 B2
(45) Date of Patent: Jun. 14, 2022

(54) SYSTEM AND METHOD FOR VALIDATING VIRTUAL SESSION REQUESTS

(71) Applicant: CITRIX SYSTEMS, INC., Fort Lauderdale, FL (US)

(72) Inventors: Georgy Momchilov, Parkland, FL (US); Hubert Divoux, Parkland, FL (US); Roberto Valdes, Weston, FL (US); Leo C. Singleton, IV, Fort Lauderdale, FL (US); Paul Browne, Weston, FL (US); Kevin Woodmansee, Lighthouse Point, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 149 days.

(21) Appl. No.: 16/847,780

(22) Filed: Apr. 14, 2020

(65) Prior Publication Data
US 2020/0374225 A1 Nov. 26, 2020

Related U.S. Application Data

(60) Provisional application No. 62/850,089, filed on May 20, 2019.

(51) Int. Cl.
H04L 45/586 (2022.01)
H04L 45/42 (2022.01)
(Continued)

(52) U.S. Cl.
CPC ........... *H04L 45/586* (2013.01); *H04L 45/42* (2013.01); *H04L 63/0442* (2013.01);
(Continued)

(58) Field of Classification Search
CPC ... H04L 45/586; H04L 45/42; H04L 63/0442; H04L 63/0876; H04L 63/108; H04L 67/141; H04L 67/42
See application file for complete search history.

(56) References Cited

U.S. PATENT DOCUMENTS 7,724,657 B2  5/2010 Rao et al.
8,141,075 B1  3/2012 Chawla et al.
(Continued)

FOREIGN PATENT DOCUMENTS

WO  WO2008011314  1/2008

OTHER PUBLICATIONS

U.S. Appl. No. 16/241,047, filed Jan. 7, 2019 Singleton et al.
(Continued)

*Primary Examiner* — Azizul Choudhury
(74) *Attorney, Agent, or Firm* — Allen, Dyer, Doppelt + Gilchrist, PA

(57) ABSTRACT

A computing system may include a computing device configured to store and update published resource entitlements for a plurality of client devices. The system may further include a plurality of virtual delivery appliances configured to receive connection requests from the client devices, with the connection requests including a connection lease issued based upon the published resource entitlements for the client devices, request validation of the connection leases from the computing device, and provide the client devices with access to virtual sessions corresponding to the published resource entitlements responsive to validation of connection leases from the computing device. The computing device, responsive to validation requests from the virtual delivery appliances, may also compare the connection leases to the updated published resource entitlements and validate virtual session requests based thereon.

18 Claims, 15 Drawing Sheets

(51) Int. Cl.
*H04L 67/141* (2022.01)
*H04L 9/40* (2022.01)
*H04L 67/01* (2022.01)

(52) U.S. Cl.
CPC ........ *H04L 63/0876* (2013.01); *H04L 63/108* (2013.01); *H04L 67/141* (2013.01); *H04L 67/42* (2013.01)

(56) References Cited

U.S. PATENT DOCUMENTS

| | | | |
|---|---|---|---|
| 8,190,676 | B2 | 5/2012 | Momchilov et al. |
| 8,555,274 | B1 | 10/2013 | Chawla et al. |
| 8,800,009 | B1 | 8/2014 | Beda, III et al. |
| 8,990,898 | B2 | 3/2015 | Bell |
| 9,009,327 | B2 | 4/2015 | Adhya et al. |
| 9,021,475 | B2 | 4/2015 | Nimmagadda et al. |
| 9,176,744 | B2 | 11/2015 | Lee |
| 9,426,227 | B2 | 8/2016 | Bell |
| 9,538,345 | B2 | 1/2017 | Sah et al. |
| 9,800,669 | B2 | 10/2017 | Bell |
| 10,019,128 | B2 | 7/2018 | Goodwin et al. |
| 10,122,709 | B2 | 11/2018 | Momchilov et al. |
| 10,868,836 | B1* | 12/2020 | Yancey ................. H04L 63/205 |
| 2009/0248869 | A1* | 10/2009 | Ghostine ................ H04W 8/30 709/225 |
| 2011/0153716 | A1 | 6/2011 | Malakapalli et al. |
| 2012/0102317 | A1* | 4/2012 | Mathur ................... H04L 63/20 713/156 |
| 2013/0219468 | A1* | 8/2013 | Bell ..................... H04L 63/0428 726/4 |
| 2013/0268584 | A1* | 10/2013 | Desai ................ H04L 29/06047 709/203 |
| 2015/0319174 | A1 | 11/2015 | Hayton et al. |
| 2015/0350101 | A1 | 12/2015 | Sinha et al. |
| 2015/0381621 | A1 | 12/2015 | Innes et al. |
| 2016/0094543 | A1 | 3/2016 | Innes et al. |
| 2016/0232025 | A1 | 8/2016 | Speak et al. |
| 2016/0330288 | A1 | 11/2016 | Hoffman et al. |
| 2016/0373520 | A1 | 12/2016 | Kumar et al. |
| 2017/0185437 | A1 | 6/2017 | Thomas |
| 2018/0007059 | A1 | 1/2018 | Innes et al. |
| 2019/0075106 | A1 | 3/2019 | Kahol et al. |
| 2019/0245848 | A1 | 8/2019 | Divoux et al. |
| 2019/0278616 | A1 | 9/2019 | Momchilov et al. |
| 2019/0278928 | A1 | 9/2019 | Rungta et al. |
| 2020/0162282 | A1* | 5/2020 | Ashtaputre ......... H04L 12/4645 |

OTHER PUBLICATIONS

Georgy Momchilov "HDX Adaptive Transport and EDT: ICA™ s New Default Transport Protocol (Part II)" https://www.citrix.com/blogs/2017/11/20/hdx-adaptive-transport-and-edt-icas-new-default-transport-protocol-part-ii; Nov. 20, 2017; pp. 7.

U.S. Appl. No. 16/194,823, filed Nov. 19, 2018; Singleton et al.

* cited by examiner

310

| validateSessionResult.status | Broker Outage | Broker Online |
|---|---|---|
| Allow | X<br>Stored, pre-signed/authorized validation for 1st VDA (cease further access until available, then re-provision given VDA to generate pre-authorized validation) | X<br>Signed |
| Deny<br>(Stop attempts) | N/A<br>Prevent black hole (clock drifting), bad VDA.<br>Instead of Deny use Soft deny, i.e. deny but redirect connection requests. | X<br>Signed<br>Reason code: CL invalid, CL expired, CL revoked |
| Soft deny | X<br>Unsigned<br>Endpoint/Gateway tries other VDAs already in CL. | N/A |
| Redirect - Target | N/A | X<br>Signed |

*FIG. 11*

SYSTEM AND METHOD FOR VALIDATING VIRTUAL SESSION REQUESTS

CROSS-REFERENCE TO RELATED APPLICATIONS

This application claims the benefit of provisional application No. 62/850,089 filed May 20, 2019, which is hereby incorporated herein in its entirety by reference.

BACKGROUND

Many organizations are now using application and/or desktop virtualization to provide a more flexible option to address the varying needs of their users. In desktop virtualization, a user's computing environment may be separated from the user's physical computing device. Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop and/or application inside a virtual machine that resides on a server. Virtualization systems may also be implemented in a cloud computing environment, or cloud system, in which a pool of computing resources, storage disks, networking hardware, and other physical resources may be used to provision virtual desktops, and/or provide access to shared applications.

SUMMARY

A method may include storing and updating published resource entitlements for a plurality of client devices at a computing device, and using a plurality of virtual delivery appliances to receive connection requests from the client devices, and request validation of the connection leases from the computing device. The connection requests may include a connection lease issued based upon the published resource entitlements for the client devices. The method may further include, at the computing device, responsive to validation requests from the virtual delivery appliances, comparing the connection leases to the updated published resource entitlements and validating the virtual session requests based thereon. The method may also include, at the virtual delivery appliances, providing the client devices with access to virtual sessions corresponding to the published resource entitlements responsive to validation of connection leases from the computing device.

The method may further include, at the computing device, generating a pre-authorized validation for the virtual delivery appliances, and at the virtual delivery appliances, providing at least one client device with access to a requested virtual session without availability of the computing device based upon the pre-authorized validation. In an example implementation, the virtual delivery appliances may be arranged in a pool, and the method may further include at a given virtual delivery appliance in the pool ceasing providing other client devices access to virtual sessions without availability of the computing device after providing the at least one client device with access to the requested virtual session. Moreover, the method may further include re-provisioning the given virtual delivery appliance to generate the pre-authorized validation after the requested virtual session is closed.

In an example embodiment, the method may further include, at the virtual delivery appliances, denying and redirecting the connection requests to other virtual delivery appliances without availability of the computing device. In accordance with another example implementation, the connection leases may list a subset of the plurality of virtual delivery appliances, and the method may further include, at the computing device, redirecting client devices with validated connection leases to virtual delivery appliances either inside or outside of the listed subset of virtual delivery appliances based upon virtual delivery appliance usage levels.

In an example implementation, the connection leases may be associated with a public/private encryption key pair and signed using the private encryption key, and the method may further include, at the virtual delivery appliances, validating the connection leases using the public encryption key prior to requesting validation of the connection leases from the computing device. Moreover, the connection leases may also be time-based, and the method may further include, at the virtual delivery appliances, performing time-based validation of the connection leases prior to requesting validation of the connection leases from the computing device, for example.

In accordance with still another example, the computing device may further have a public/private key pair associated therewith, the public key of the computing device may be signed by a private key of a Root of Trust (RoT), and the method may further include, at the computing device, providing its signed public key along with virtual session request validations to the virtual delivery appliances. In one example implementation, the method may further include authenticating the signed public key of the computing device using a public key of the RoT, authenticating the virtual session request validations using the authenticated public key of the computing device, and establishing session connections between the client devices and the virtual delivery appliances responsive to authenticating the virtual session request validations. In accordance with another example implementation, the method may further include, at the client devices, authenticating the signed public key of the computing device using a public key of the RoT, authenticating the virtual session request validations using the authenticated public key of the computing device, and establishing session connections with the virtual delivery appliances responsive to authenticating the virtual session request validations.

A related computing system may include a computing device configured to store and update published resource entitlements for a plurality of client devices. The system may further include a plurality of virtual delivery appliances configured to receive connection requests from the client devices, with the connection requests including a connection lease issued based upon the published resource entitlements for the client devices, request validation of the connection leases from the computing device, and provide the client devices with access to virtual sessions corresponding to the published resource entitlements responsive to validation of connection leases from the computing device. The computing device, responsive to validation requests from the virtual delivery appliances, may also compare the connection leases to the updated published resource entitlements and validate virtual session requests based thereon.

A related virtual delivery appliance is also provided.

BRIEF DESCRIPTION OF THE DRAWINGS

FIG. 11 is a table listing different validation scenarios by the broker of the system of FIG. 7 in accordance with an example implementation.

DETAILED DESCRIPTION

In a virtual computing architecture, connection leases may be issued to client devices by a brokering service. The connection leases may include static snapshots of resource entitlements the client devices are permitted to access. By way of example, the resources being accessed by the client devices may include virtual applications, virtual desktops, Software-as-a-Service (SaaS) applications, Desktop-as-a-Service (DaaS) sessions, etc. Moreover, the connection leases may also include resource location data allowing for relatively long-term access (e.g., one or more weeks) before the connection lease expires and has to be renewed. This helps promote faster access to the resources by the client devices, as they are not required to re-register with the brokering service each time they request access to a virtual computing session. However, in some circumstances, the static nature of connection leases, coupled with the dynamic nature of user entitlements and state of the published resource locations, may lead to certain resiliency or performance issues. For example, users may lose the ability to continue previously established sessions, session share with an application in an existing session, establish a connection with a virtual delivery appliance due to clock drifting or out of date security keys, etc.

The approach set forth herein advantageously allows for the continued use of such static connection leases to retain faster access by client devices, yet while permitting virtual delivery appliances that connect the client devices with the various resources to cooperate with the brokering service to validate whether the client entitlements (resources such as applications or desktops users have permission to use which are specified in connection leases) are up to date, in real-time, responsive to session requests. Moreover, the approach set forth herein also advantageously allows for partial but still secure operation during periods of unavailability of the brokering service by allowing the virtual delivery appliances to assume certain functions of the brokering service during the period of unavailability. That is, while full connection functionality that would otherwise be provided is not available due to the brokering service outage, the virtual delivery appliances may still be able to provide some connections on a controlled basis.

Figure 1:
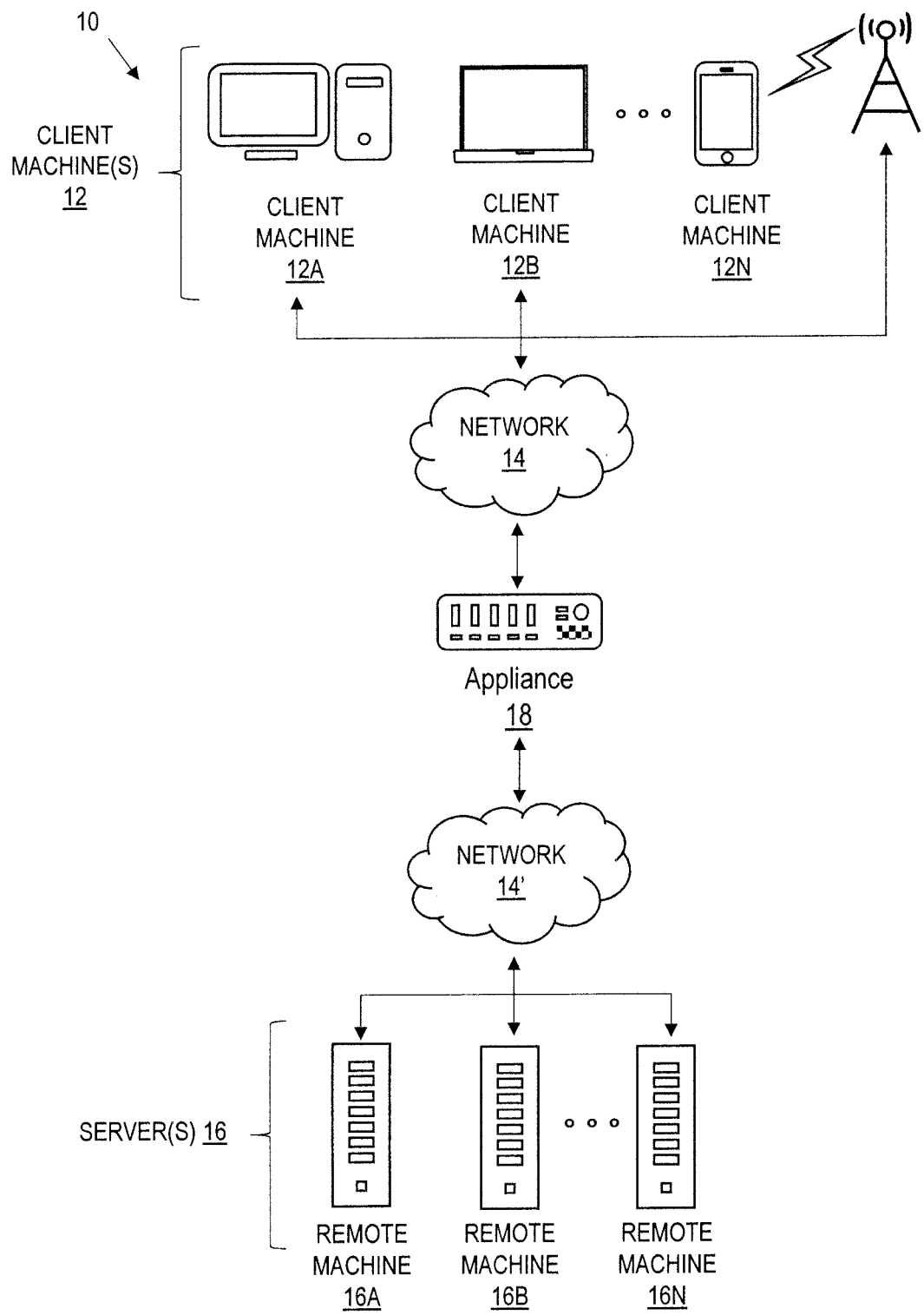
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
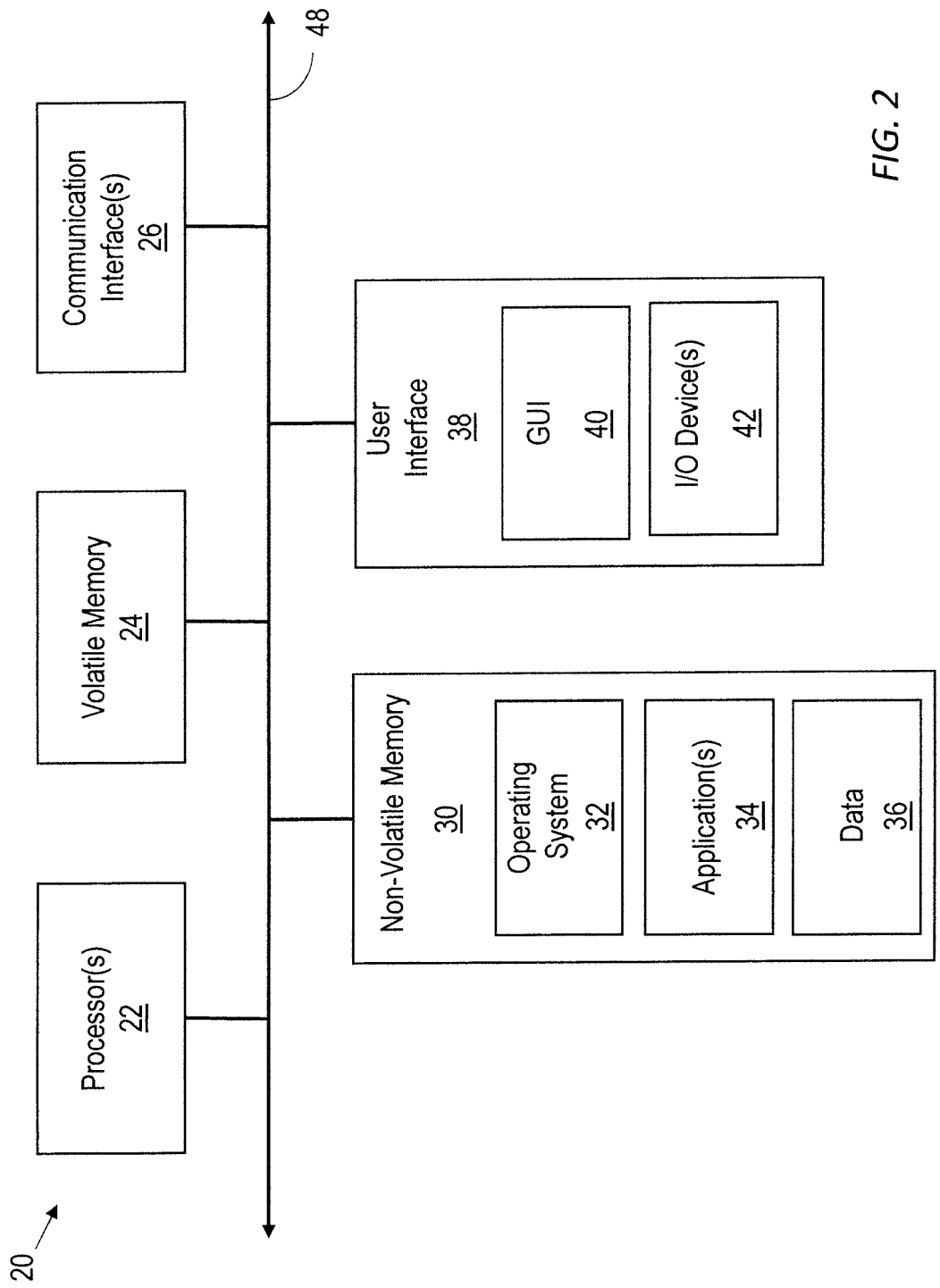
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
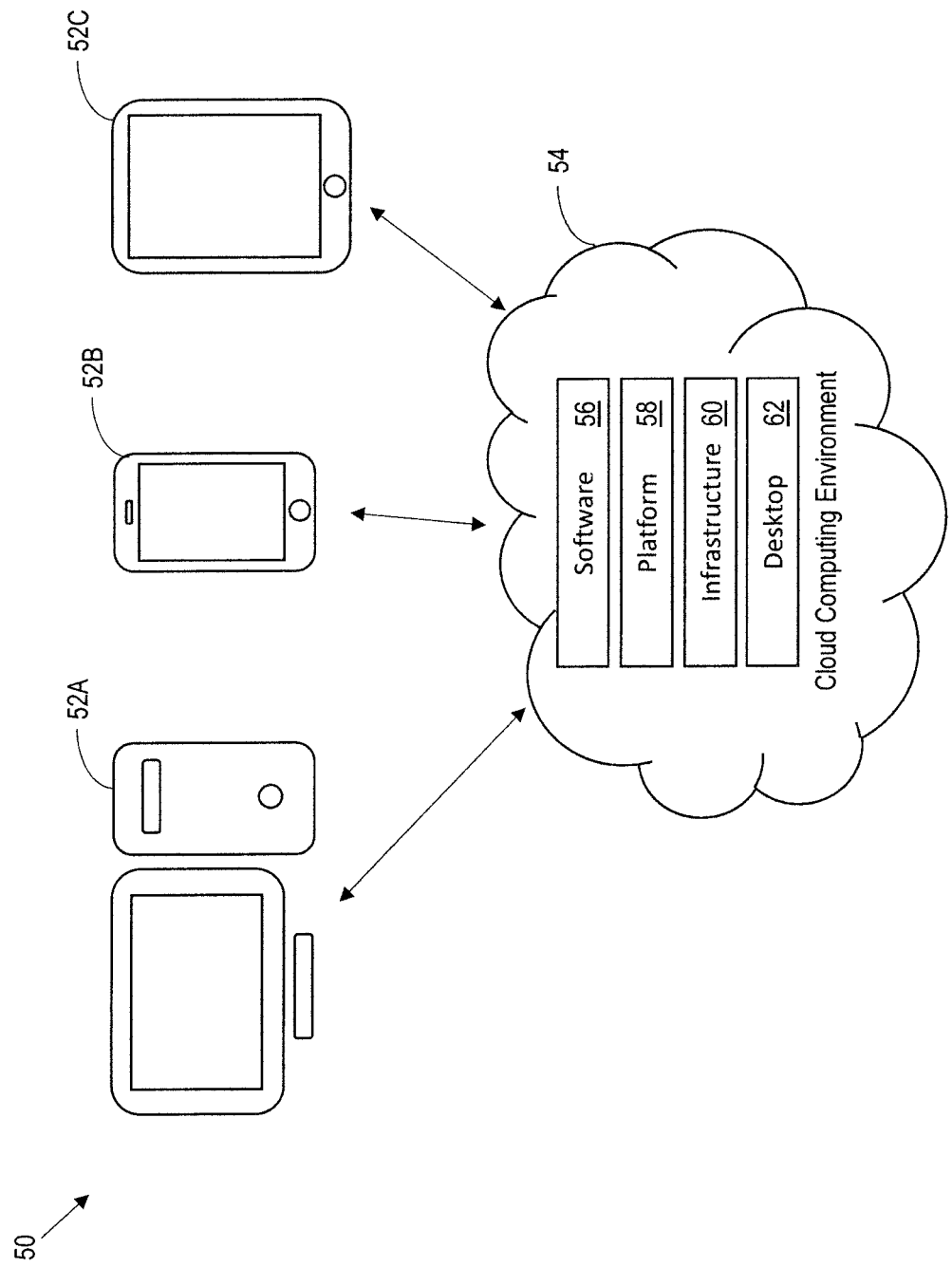
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
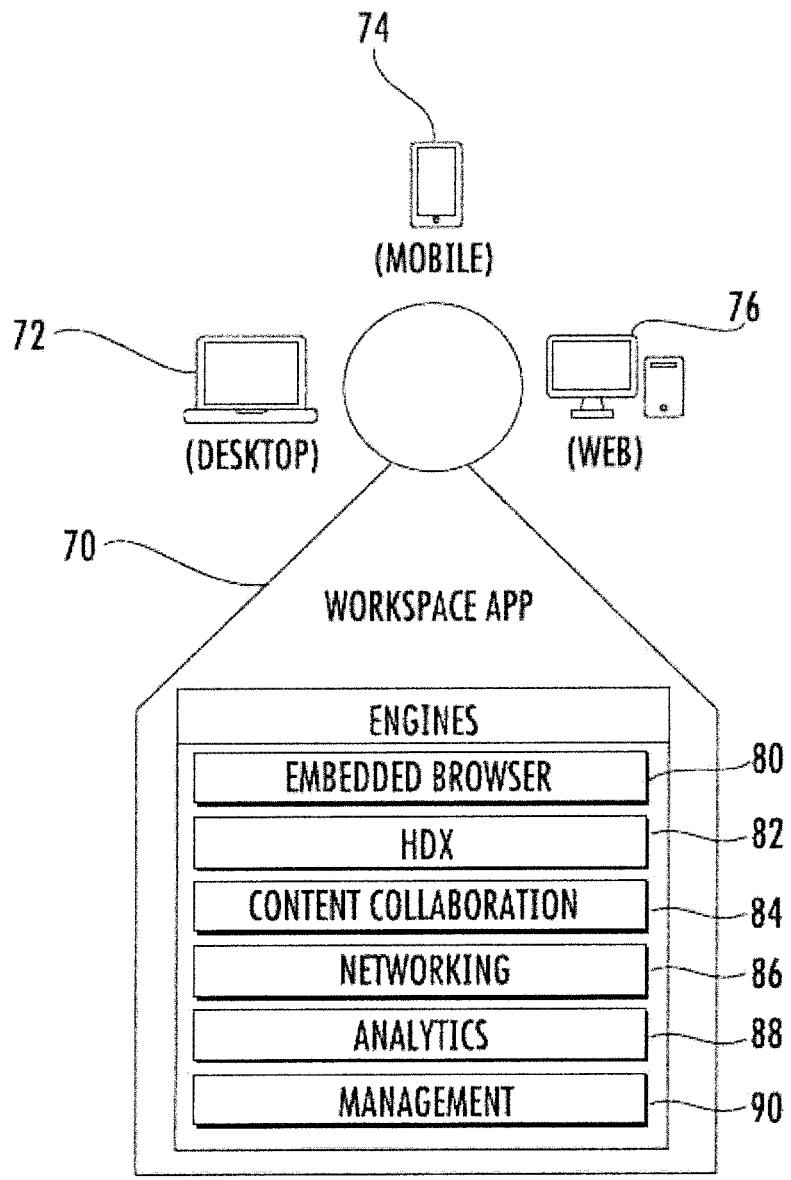
FIG. 4 is a schematic block diagram of desktop, mobile and web-based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
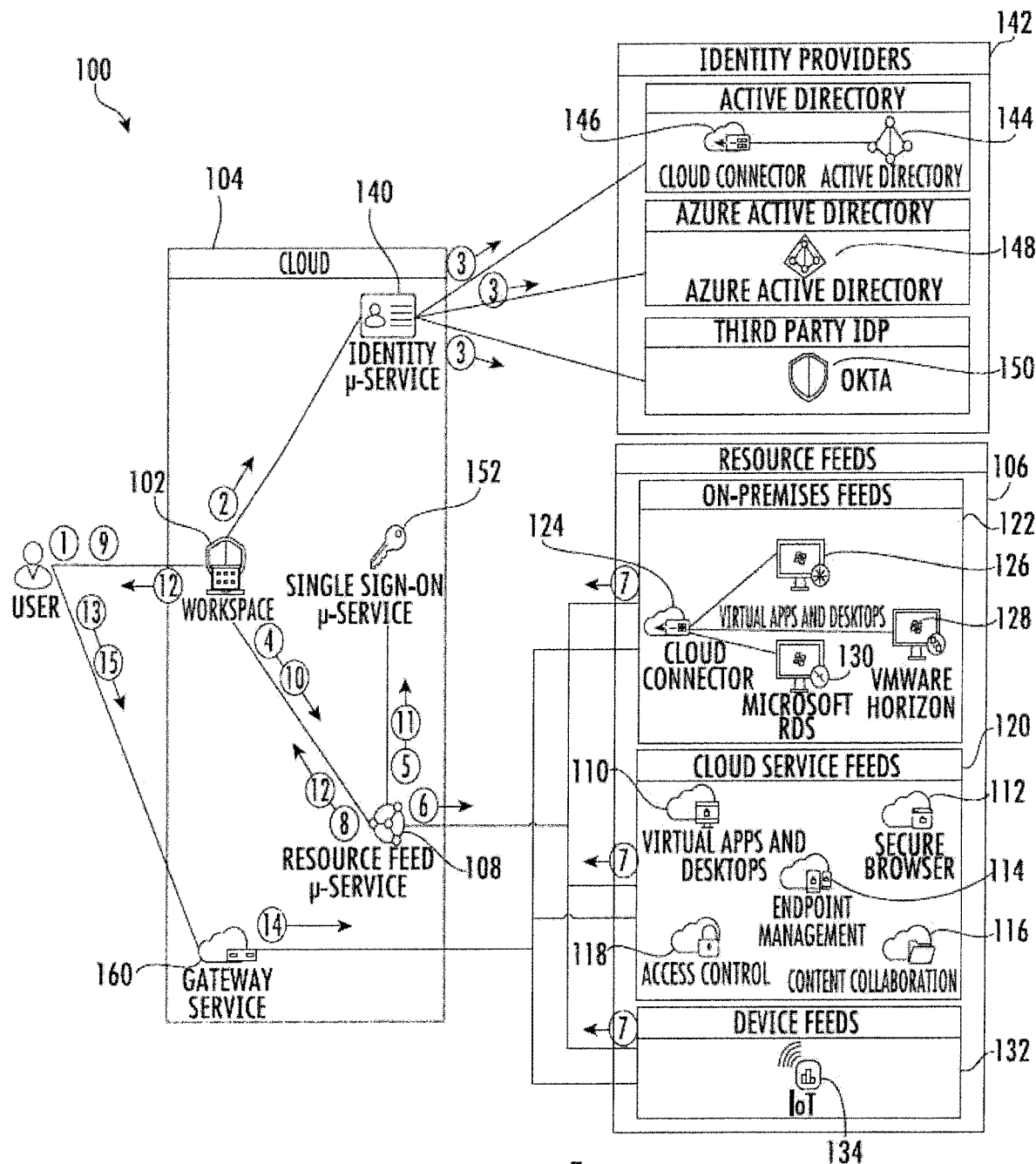
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Cloud 104. The workspace experience service 102 then pulls in all the different resource feeds 16 via a resource feed micro-service 108. That is, all the different resources from other services running in the Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Cloud 104, and presenting their identity (event 1). The identity includes a username and password, for example.

The workspace experience service 102 forwards the user's identity to an identity micro-service 140 within the Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third-party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
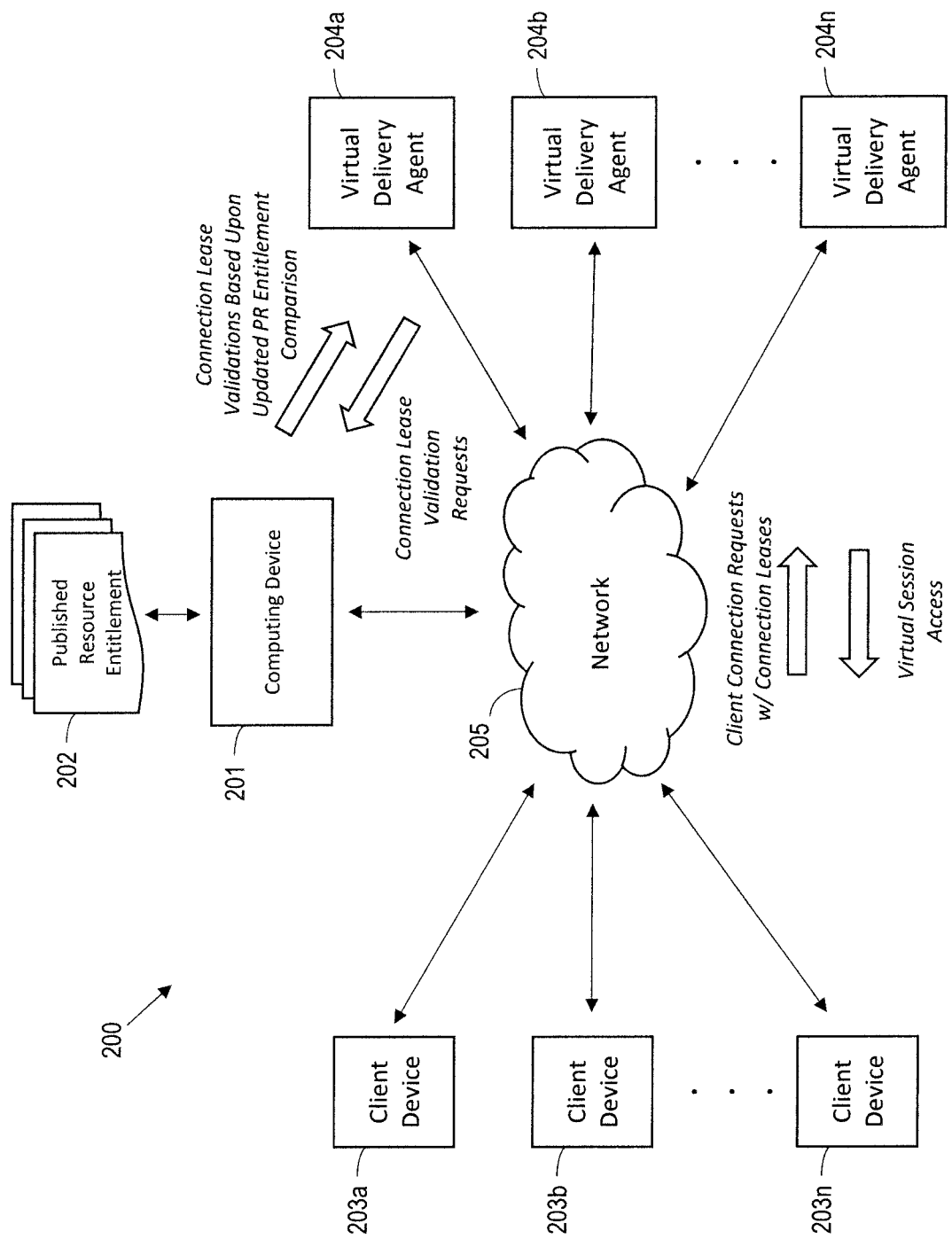
FIG. 6 is a schematic block diagram of a computing system providing virtual session access through connection leases in accordance with an example embodiment.

Turning now to FIG. 6, a virtual computing system 200 is first described which provides for enhanced connection leases for accessing virtual computing sessions. By way of example, the system 200 may be implemented using the above described computing devices, and in some implementations within the workspace infrastructure. Another example architecture for providing access to virtual computing sessions is Citrix Virtual Apps and Desktops (CVAD) from the present Applicant Citrix Systems, Inc. Citrix Virtual Apps is an application virtualization solution that helps optimize productivity with universal access to virtual apps and server-based desktops from different client devices. CVAD carries all the same functionality as Citrix Virtual Apps, plus the option to implement a scalable Virtual Desktop Infrastructure (VDI). Citrix Virtual Apps/CVAD are available as a cloud service or a traditional software configuration.

Such computer virtualization infrastructures may traditionally utilize Independent Computing Architecture (ICA) protocol and ICA files for authenticating client devices to access the virtual sessions and computing resources to which the users are entitled. ICA is a protocol designed for transmitting Windows graphical display data as well as user input over a network. ICA files contain short-lived Secure Ticket Authority (STA) and logon tickets. The STA ticket may be used to authorize a connection to a virtual delivery appliance (e.g., Citrix Virtual Delivery Agent (VDA)) via a Gateway (e.g., Citrix Gateway). The logon ticket may single-sign-on (SSOn) the user into the virtual computing session. In the case of CVAD, this is done through a "high-definition" experience (HDX) session, which may be available to users of centralized applications and desktops, on different client devices and over different networks. Citrix HDX is built on top of the ICA remoting protocol.

With any network infrastructure, remote or otherwise, security from external attacks is always a significant concern. Moreover, connection leases are long-lived (e.g., a few hours to weeks based on policies), and the attack opportunity window is therefore increased, the security requirements are also increased compared to traditional ICA files. Therefore, connection leases are encrypted and signed. Connection leases may also be revoked to cope with events such as stolen devices, compromised user accounts, closed user accounts, etc. Connection lease revocation is applied when a client/endpoint device or host is online with respect to a Connection Lease Issuing Service (CLIS) or broker. However, the CLIS or broker does not typically have to be online for a client to use a previously issued connection lease, since connection leases are meant to be used in an offline mode.

The system 200 illustratively includes a computing device 201 configured to store and update published resource entitlements 202 for a plurality of client devices 203a-203n. By way of example, the computing device 201 may be part of a brokering service or connection lease issuing service, and the published resource entitlements may relate to the virtual computing resources (e.g., SaaS apps, DaaS sessions, virtual apps/desktops, etc.) that the client devices 203a-203n are permitted or authorized to access. The client devices 203a-203n may be desktop or laptop computers, tablet computers, smartphones, etc., as noted above.

The system 200 further illustratively includes a plurality of virtual delivery appliances 204a-204n that communicate with the client devices 203a-203n via a network 205 (e.g., the Internet or Web). The virtual delivery appliances 204a-204n are configured to receive connection requests from the client devices 203a-203b that include connection leases issued based upon the respective published resource entitlements 202 for the client devices. In an example implementation, the virtual delivery appliances 204a-204n may be implemented using Citrix Virtual Delivery Agents (VDAs), for example, although other suitable virtual delivery appliances may be used in different implementations.

The virtual delivery appliances 204a-204n are also configured to request validation of the connection leases from the computing device 201, and provide the client devices 203a-203n with access to virtual sessions corresponding to the published resource entitlements 202 responsive to validation of connection leases from the computing device. In this regard, the computing device 201, responsive to validation requests from the virtual delivery appliances 204a-204n, also compares the connection leases to the updated published resource entitlements 202 it maintains and validates the virtual session requests accordingly.

Figure 7:
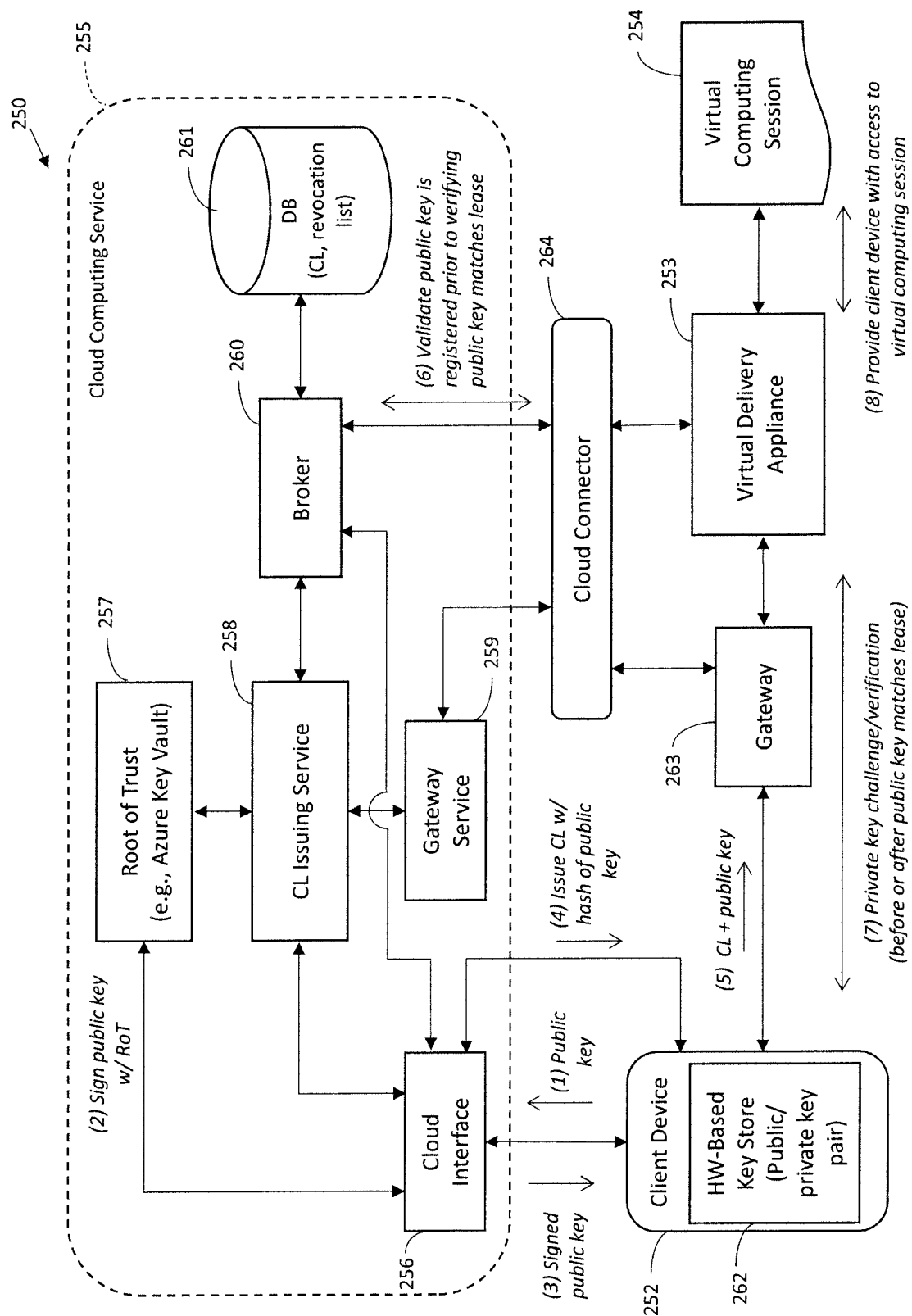
FIG. 7 is a schematic block diagram of a connection lease architecture and independent flow sequences in which the system of FIG. 6 may be implemented in accordance with an example embodiment.

The foregoing will now be further described in the context of an example implementation of a computing system 250 shown in FIG. 7. In the illustrated example, the above-described computing device 201 and lease generation functions are performed within a cloud computing service 255 (e.g., Citrix Cloud) which illustratively includes a cloud interface 256 configured to interface with a client device 252 for enrollment and lease generation. In an example implementation, the cloud interface 256 may be implemented with Citrix Workspace, and the client device 252 may be running Citrix Workspace App, although other suitable platforms may be used in different embodiments. The cloud computing service 255 further illustratively includes a root of trust (RoT) 257, Connection Lease Issuing Service (CLIS) 258, gateway service 259, broker 260, and database 261, which will be described further below.

The client device 252 has a public-private encryption key pair associated therewith, which in the illustrated example is created by a hardware-backed key store 262. The hardware-backed key store 262 prevents the client device 252 operating system (OS) from accessing the private key. The client device 252 OS performs cryptographic operations with the private key, but without the ability to access/export the key. Examples of hardware-backed key stores include Trusted Platform Module (TPM) on a personal computer (PC), iOS Secure Enclave, and Android Hardware Key Store, for example, although other suitable encryption key generation platforms may also be used. As a background, in some embodiments, a hardware-backed key store 262, such as a TPM, is a microchip installed on the motherboard of client device 252 and designed to provide basic security-related functions, e.g. primarily involving encryption keys. A hardware-backed key store 262 communicates with the remainder of the system by using a hardware bus. A client device 252 that incorporates a hardware-backed key store 262 can create cryptographic keys and encrypt them so that they can only be decrypted by the hardware-backed key store 262. This process, referred to as wrapping or binding a key, can help protect the key from disclosure. A hardware-backed key store 262 could have a master wrapping key, called the storage root key, which is stored within the hardware-backed key store 262 itself. The private portion of a storage root key or endorsement key that is created in a hardware-backed key store 262 is never exposed to any other component, software, process, or user. Because a hardware-backed key store 262 uses its own internal firmware and logic circuits to process instructions, it does not rely on the operating system, and it is not exposed to vulnerabilities that might exist in the operating system or application software.

Turning back to FIG. 7, the client device 252 provides its public key to the cloud interface 256 (step (1) in FIG. 7), which then has the public key signed by the RoT 257 (step (2) in FIG. 7) and returns the signed public key to the client device (step (3) in FIG. 7). Having the public key signed by the RoT 257 is significant because the gateway 263, the virtual delivery appliance 253, and the broker 260 also trust the RoT and can therefore use its signature to authenticate the client device public key.

The client device 252 may then communicate with the CLIS 258 via the cloud interface 256 to obtain the connection lease (step (4) in FIG. 7). The client device 252 public key may be provided to a host or virtual delivery appliance 253 (e.g., Citrix VDA) either indirectly via the broker 260 or directly by the client device. If the client device 252 public key is indirectly provided to the virtual delivery appliance 253, then the security associated with the client-to-broker communications and virtual deliver appliance-to-broker communications may be leveraged for secure client public key transmission. However, this may involve a relatively large number of client public keys (from multiple different client devices 252) being communicated indirectly to the virtual delivery appliance 253.

On the other hand, the client device 252 public key could be directly provided by the client device to the virtual delivery appliance 253, which in the present case is done via the gateway 263 (step (5) in FIG. 7). Both the client device 252 and the virtual delivery appliance 253 trust the RoT 257. Since the virtual delivery appliance 253 trusts the RoT 257 and has access to the RoT public key, the virtual delivery appliance 253 is able to verify the validity of the client device 252 based on the RoT signature on the public key and, if valid, may then trust the client device public key. In yet another embodiment, the client device public key may also optionally be signed by the broker 260 beforehand. Both the client device 252 and the virtual delivery appliance 253 trust the broker 260. Since the virtual delivery appliance 253 trusts the broker 260 and has access to the broker public key, the virtual delivery appliance 253 is able to verify the validity of the client device 252 based on the Broker signature on the public key and, if valid, may then trust the client device public key. In the illustrated example, the signed public key of the client device 252 is provided directly to the virtual delivery appliance 253 along with the connection lease via a gateway 263. In an example implementation, the gateway 263 may be implemented using Citrix Gateway, for example, although other suitable platforms may also be used in different embodiments.

The virtual delivery appliance 253 and gateway 263 may communicate with the broker 260 and gateway service 259 (which may be implemented using Citrix Secure Web Gateway, for example) via a cloud connector 264. In an example embodiment, the cloud connector 264 may be implemented with Citrix Cloud Connector, although other suitable platforms may also be used in different embodiments. Citrix Cloud Connector is a component that serves as a channel for communication between Citrix Cloud and customer resource locations, enabling cloud management without requiring complex networking or infrastructure configuration. However, other suitable cloud connection infrastructure may also be used in different embodiments.

The client device 252 signed public key or a hash of the client device signed public key (thumbprint) is included in the connection lease generated by the CLIS 258 and is one of the fields of the connection lease that are included when computing the signature of the connection lease. The signature of the connection lease helps ensure that the connection lease contents are valid and have not been tampered with. As a result, a connection lease is created for the specific client device 252, not just a specific authenticated user.

Furthermore, the virtual delivery appliance 253 may use a challenge-response to validate that the client device 252 is the true owner of the corresponding private key. First, the virtual delivery appliance 253 validates that the client device 252 public key is valid, and more particularly signed by the RoT 257 and/or broker 260 (step (6) in FIG. 7). In the illustrated example, the client device 252 public key was sent directly by the client device to the virtual delivery appliance 253, as noted above. In some embodiments, connection lease revocation may be applied when a client device 252 or virtual delivery appliance 253 is offline with respect to the CLIS 258 or broker 260. Being online is not a requirement for use of a connection lease since connection leases may be used in an offline mode. Connection lease and revocation list details may be stored in the database 261 for comparison by the broker 260 with the information provided by the virtual delivery appliance 253.

Second, upon early session establishment, e.g. after transport and presentation-level protocol establishment, between the client device 252 and virtual delivery appliance 253, the virtual delivery appliance 253 challenges the client device 252 to sign a nonce (an arbitrary number used once in a cryptographic communication) with its private key (step (7) in FIG. 7). The virtual delivery appliance 253 verifies the signature of the nonce with the client device 252 public key. This allows the virtual delivery appliance 253 to know that the client device 252 is in fact the owner of the corresponding private key. It should be noted that this step could be performed prior to validating the public key of the client device 252 with the RoT 257 and/or broker 260 in some embodiments, if desired.

Furthermore, the virtual delivery appliance 253 validates that the connection lease includes the public key (or hash of public key) matching the client device 252 public key. More particularly, the virtual delivery appliance 253 first validates the connection lease signature and date, making sure that the broker 260 signature on the lease is valid (using the RoT 257 signed broker public key, since the virtual delivery appliance trusts the RoT) and that the lease has not expired. Moreover, the virtual delivery appliance 253 may verify that the connection lease includes the client device 252 public key, or a hash of the client device public key, in which case the virtual delivery appliance computes the hash of the client device public key. If the connection lease includes the matching client device 252 public key, then the virtual delivery appliance 253 confirms that the connection lease was sent from the client device for which it was created.

As a result, if a connection lease is stolen from the client device 252 and used from a malicious client device, the session establishment between the malicious client and the virtual delivery appliance 253 will not succeed because the malicious client device will not have access to the client private key, this key being non-exportable and stored in the hardware-backed key store 262.

As briefly noted above with reference to FIG. 6, the illustrated connection lease management infrastructure also advantageously allows for connection lease validation using a "reverse prepare for session" operation from the virtual delivery appliance 253 (e.g., a Citrix VDA, etc.), as a target resource location, to the Broker 260 (e.g., Citrix Virtual Apps and Desktop Broker). This may be done in conjunction with the connection lease exchange that occurs between the client device 252 and the virtual delivery appliance 253, and utilizing signed responses from the broker 260 and virtual delivery appliance 253. As will be described further below, these play a significant role for the resiliency, security, performance and user experience (UX) with respect to connection leasing. Moreover, as will be described further below, the connection lease management infrastructure also allows for online mode versus offline mode as a stage in the hierarchical opportunistic approach for increasing resiliency and promoting accurate real-time data on entitlements, policies and connection steering.

More particularly, as noted above, connection leases include static snapshots of entitlements and resource location data for long-term use (e.g., one week). However, in some circumstances, the static nature of CLs coupled with the dynamic nature of user entitlements and state of the published resource locations may lead to resiliency or performance issues. For example, an individual resource location (e.g., a virtual delivery appliance 253) may not have any knowledge about a session a user already has running on a different machine. Inter-virtual delivery appliance communication may be complex, require special security measures, and be difficult to maintain with latest software versions. Further still, even if inter-VDA communication was available for virtual delivery appliances 253 to exchange knowledge of their states, user sessions, etc., a security issue may still exist if the client device 252 somehow comes to rely on a potentially malicious virtual delivery appliance to redirect it to the right virtual delivery appliance instance.

Techniques for intelligent distribution of virtual delivery appliance 253 assignments per user connection lease improve the chances that a user gets back to their session on their preferred virtual delivery appliance instance, but they are not guaranteed to always work. For example, a virtual delivery appliance may have been down or overloaded (low available CPU, memory or network bandwidth) and the user might have been redirected to another virtual delivery appliance instance (e.g., as a result of a connection lease fan-out approach that directs a client device to alternate virtual delivery appliances listed in the connection lease based upon high usage, outages, etc.). As a result, the user would get a new session and not be able to continue her work from where she left off in the previous session on the other appliance.

In another example issue, the user may not be able to session-share with an application in an existing session, which leads to performance (logon time), scalability (for the virtual delivery appliance) and user experience (e.g., no direct copy-paste or other inter-app communication) issues. Furthermore, the above-noted connection lease approach in some circumstances may also potentially cause performance issues, since the client device 252 or the gateway 263 has to repeatedly try connecting to the next virtual delivery appliance instance listed in the connection lease.

Furthermore, security issues may exist around the use of pooled virtual delivery appliances 253, which are machine instances that are assigned upon first use. If the software on a pooled virtual delivery appliance 253 was somehow maliciously altered to make it appear that the pooled virtual delivery appliance is still not in use, a different user may then connect to the same virtual delivery appliance 253 if it is also listed in their connection lease, successfully get authorized by the broker 260, and provide his credentials either via a single sign on or interactively to the appliance 253. The altered software on the virtual delivery appliance 253 could then collect the user credentials on behalf of the malicious user. Thus, the malicious user could potentially collect the credentials of other unsuspecting users.

Another potential issue is that a virtual delivery appliance 253 listed in a connection lease may experience issues such as clock-drifting, thus rejecting an otherwise valid connection lease during the connection lease exchange due to an errant time validation. If that virtual delivery appliance 253 is included in the connection leases of many users, an outage may occur, in that the virtual delivery appliance with the drifted clock will become a "black hole". Similarly, software on a virtual delivery appliance 253 could potentially become corrupted, and keys of the appliance 253 may become invalid if the virtual delivery appliance has been offline for a long time and keys have rotated. Without contacting the broker 260, the virtual delivery appliance 253 may here again reject connections and risk becoming a "black hole".

In a power management scenario, still another issue is that a limited set of virtual delivery appliances 253 listed in a user's connection lease may no longer be available (e.g., machines shut down, etc.). Similarly, the set of pooled virtual delivery appliances 253 in a connection lease might already be in use by other users. As a result, the user will not be able to connect even though there may be available machines, because the machines listed in the user's connection lease are unavailable.

The approach described herein advantageously helps overcome these technical challenges and offers additional benefits. More particularly, during normal operating conditions when the broker 260 is available or online, the virtual delivery appliances 253 utilize real-time data from the broker and signed responses to validate the connection leases and connect the client devices 252 with requested resources (the virtual computing sessions 254). That is, the virtual delivery appliances 253 are not constrained to the static snapshots of entitlements and resource location data in connection leases but instead access real-time, updated published resource entitlement data from the broker 260 when providing session access (step (8) in FIG. 7).

Figure 8:
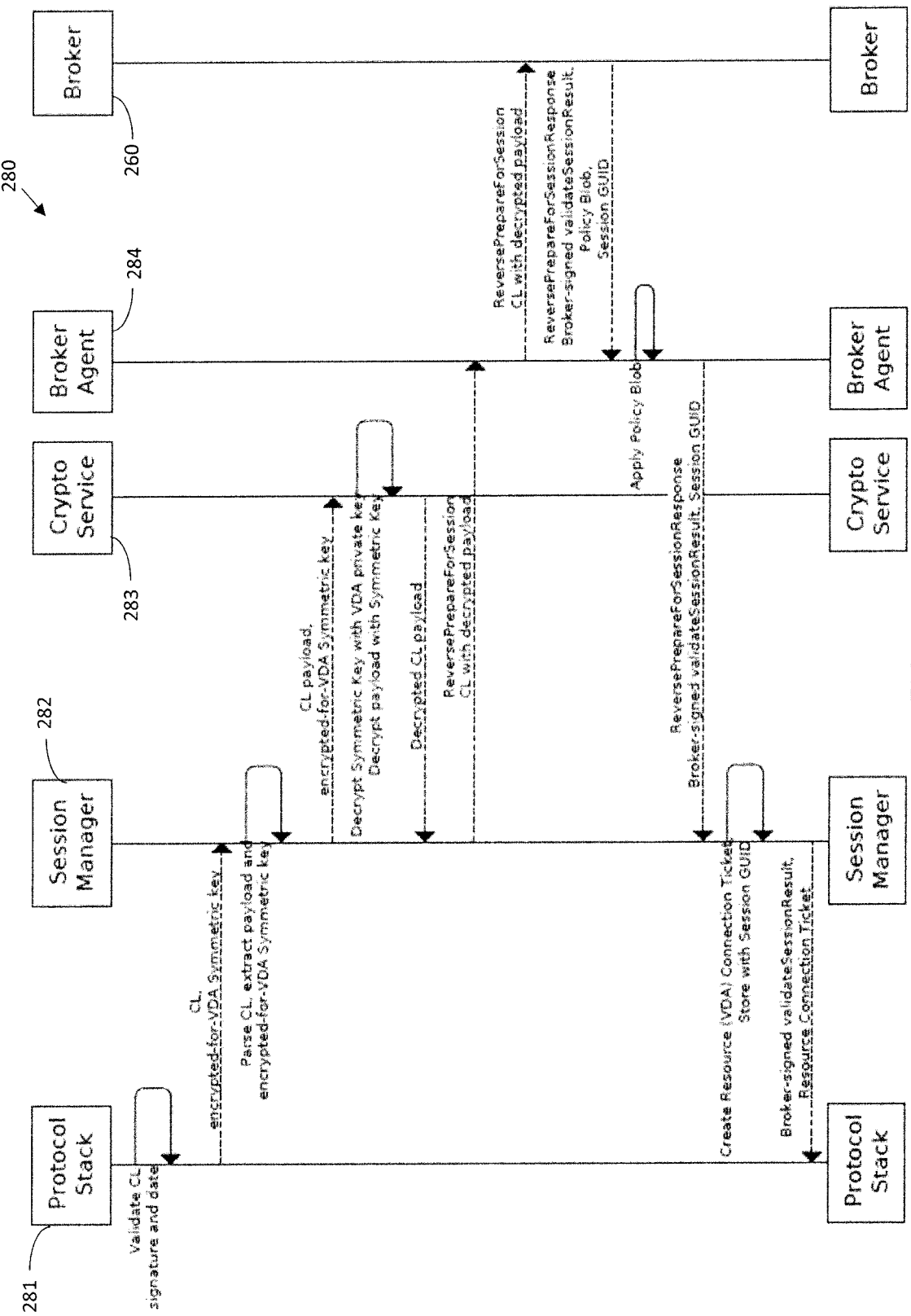
FIG. 8 is a sequence diagram of a virtual delivery appliance reverse prepare for session sequence that may be performed within the system of FIG. 7 in an example embodiment.

In this regard, the virtual delivery appliances 253 may be used as a virtual "store service" at the time of session access to communicate back to the broker 260 via a reverse prepare for session operation to provide current real-time and up-to-date data on entitlements, policies and connection steering (directing a client device 252 to a different virtual delivery appliance than originally requested), for example. An example reverse prepare for session sequence that occurs when the broker 260 is online and a valid connection lease request is presented by the virtual delivery appliance 253 is shown in the sequence diagram 280 of FIG. 8. In the illustrated example, a protocol stack 281 at the virtual delivery appliance 253 performs an initial validation of the connection lease signature and date, which it then passes to a session manager 282 at the virtual delivery appliance 253 along with a connection lease symmetric key, which in some embodiments may be encrypted with the virtual delivery appliance 253 public key, so that the session manager 282 may parse the connection lease and extract its payload. In some embodiments the connection lease may be in the form of a JavaScript Object Notation (JSON) document and may be comprised of at least a manifest, payload and signature sections. The manifest of the connection lease may be in the clear, i.e. not encrypted, and may contain information such as connection lease identifier (ID), type (e.g. Citrix Virtual Apps and Desktops), validity period (valid-from and valid-to date and time), user ID, customer ID, workspace store (e.g. cloud interface 256) Uniform Resource Locator (URL), published resource key and name, endpoint (e.g. client device 252) public key thumbprint (e.g. hash), etc. The connection lease payload may be encrypted with the aforementioned symmetric key, and may contain at least one of virtual delivery appliance IP address and/or fully qualified domain name (FQDN), port numbers, transport type, proxy information, zone information, gateway information, cloud connector information, virtual session preferences (e.g. session resolution, audio, video, USB and other device type preferences, seamless application versus desktop mode), etc. The connection lease signature may be applied to both the manifest and payload sections to ensure the connection lease has not been tempered with. Turning back to the sequence diagram 280 of FIG. 8, the session manager 282 may further communicate with a crypto service 283 at the virtual delivery appliance 253, which may decrypt the connection lease symmetric key with the virtual delivery appliance 253 private key, decrypt the payload with the connection lease symmetric key, and return the decrypted payload to the session manager 282.

Since, as previously described, the connection lease manifest already includes the user identifier (ID) and published resource key, the session manager 282 may then proceed to initiate the reverse prepare for session operation by forwarding the connection lease manifest and payload to a broker agent 284 of the virtual delivery appliance 253, which passes the validation request along to the broker 260. The broker 260, in turn, validates and signs the session results and returns the appropriate information to the broker agent 284 (e.g., in the form of a status indicating allowed or denied request, a policy blob, etc.). The broker agent 284 then applies the policy blob at the virtual delivery appliance 253 and returns a broker-signed validated session result (e.g. validateSessionResult) to the session manager 282. The session manager 282 may accordingly create a resource connection ticket (e.g. a virtual delivery appliance 253 connection ticket), which is then provided to the protocol stack 281 along with the broker-signed (validated) session result.

The reverse prepare for session call from the virtual delivery appliance 253 to the broker 260 returns to the virtual delivery appliance 253 the validateSessionResult, which includes status of the request (e.g. allowed, denied, redirect to another virtual delivery appliance instance, etc.) and other information. The broker 260 signs validateSessionResult for performance and resiliency, e.g., independence from other services. The public key of the broker 260 is advantageously included in the user's resource connection lease. As such, the client device 252 and gateway 263 can validate the signature of validateSessionResult because they have already validated and trust the connection lease itself. In an alternative embodiment, the public key of the broker 260 signed by the private key of the root of trust (RoT) 257 could advantageously be included in the signed validateSessionResult itself. As such, the client device 252 and gateway 263 can first validate the signature of the included public key of broker 269 using the public key of RoT 257, since they both trust the RoT 257, then validate the signature of validateSessionResult using the validated public key of broker 269. Table 310 of FIG. 11 lists the values returned as part of validateSessionResult in online versus outage modes of the broker 260, where it is shown in the "Allow" row that a signed (validated) validateSessionResult is provided by the broker 260 for a valid connection lease when the broker is online.

Figure 9A:
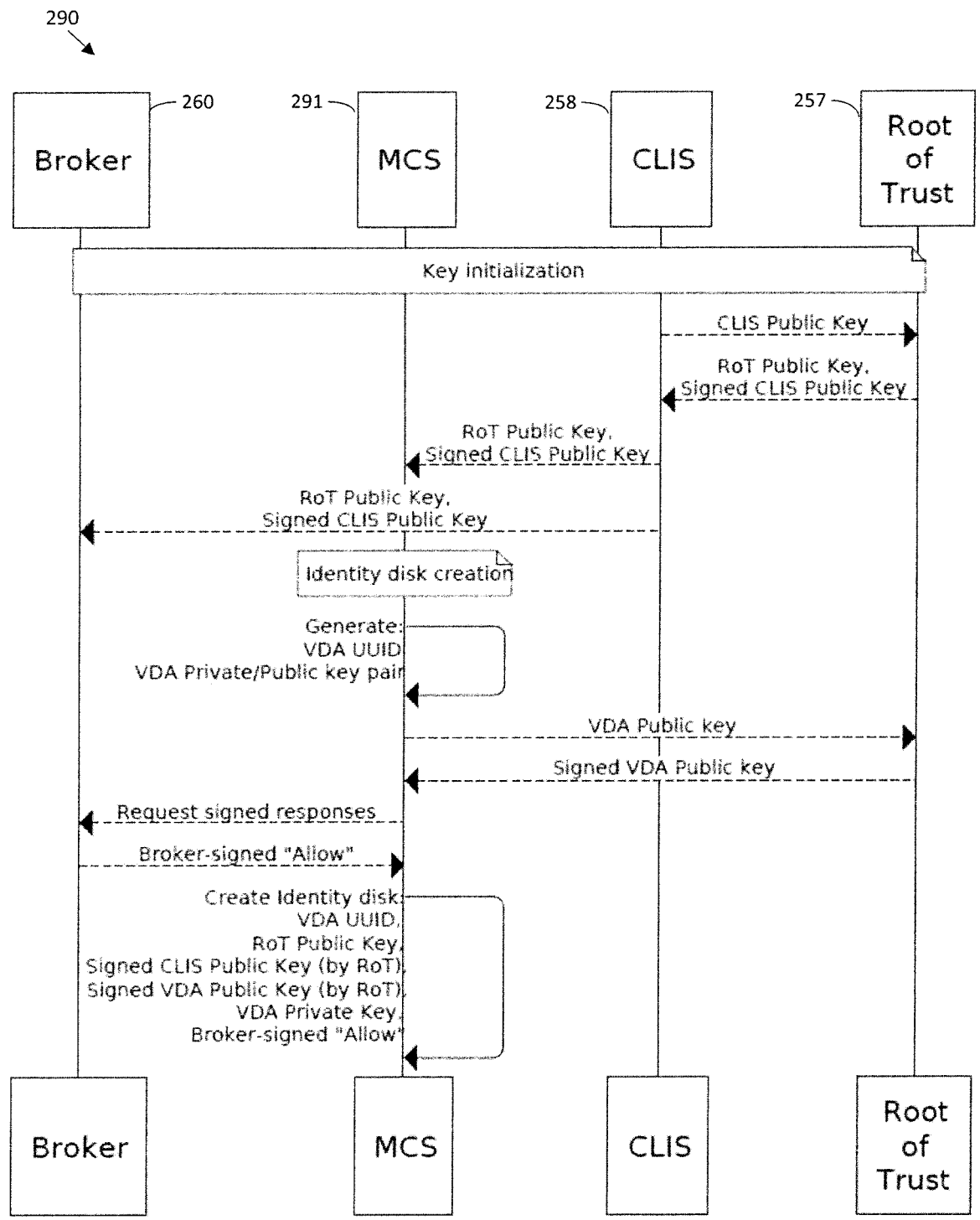
FIGS. 9A-9B are a sequence diagram of a virtual delivery appliance-broker registration sequence that may be performed within the system of FIG. 7 in an example embodiment.
Figure 9B:
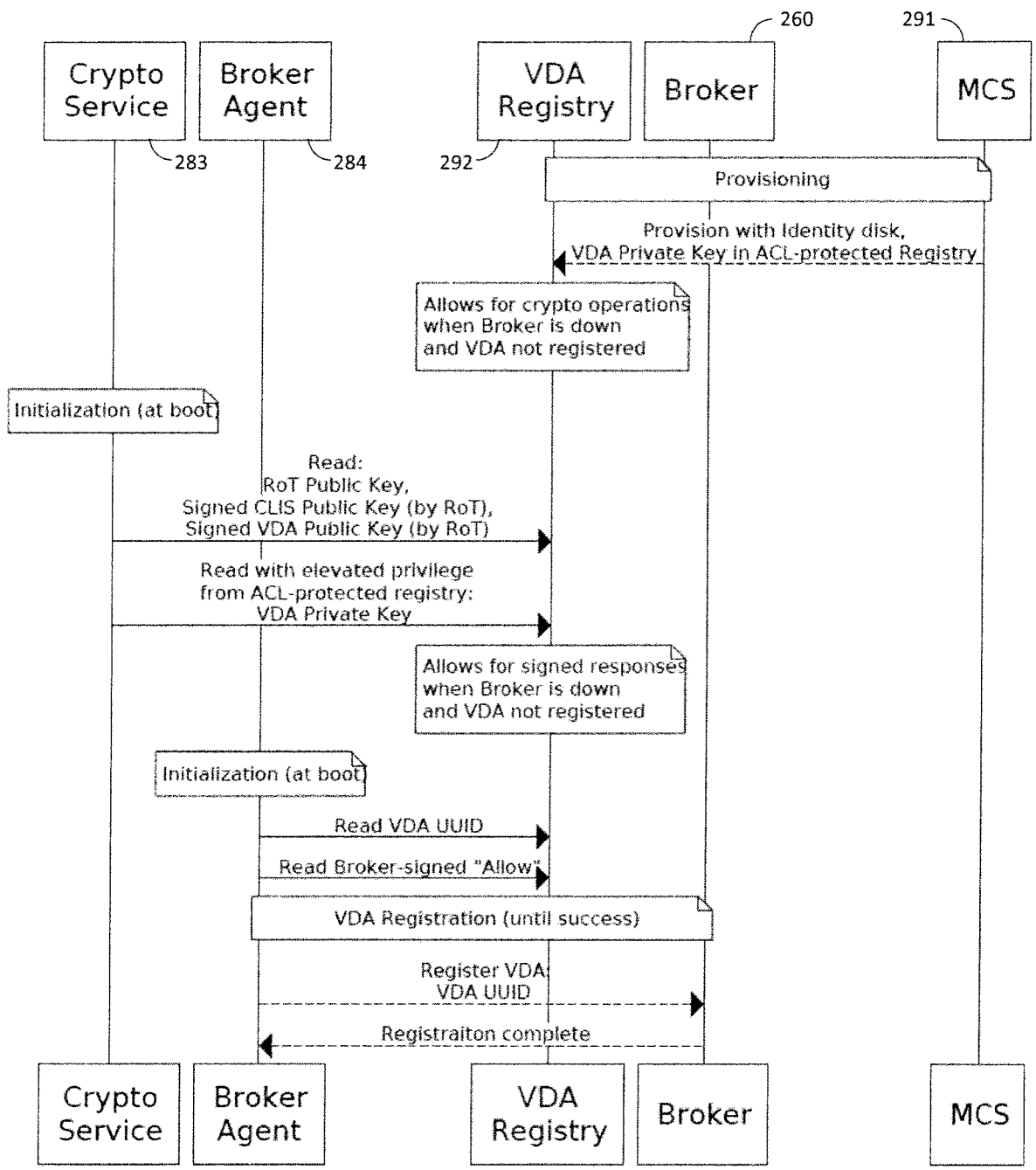

An example virtual delivery appliance 253 to broker 260 registration sequence is now described with reference to the sequence diagram 290 of FIGS. 9A-9B. Key initialization begins with the connection lease issuing service (CLIS) 258 providing its public key to the root of trust (RoT) 257, which is signed and returned to the CLIS along with the RoT public key and then passed along to the Machine Creation Service (MCS) 291 and the broker 260. The MCS 291 generates a virtual delivery appliance 253 universally unique identifier (QUID) and virtual delivery appliance private/public key pair, and has the public key signed by the RoT 257. The MCS 291 then requests a signed response from the broker 260, and receives a response to the connection request in the form of a broker signed "allow", at which point the MCS may create an identity disk for the virtual delivery appliance 253 including this information.

The identity disk may then be used to provision a virtual delivery appliance registry 292 or equivalent access-control list (ACL) protected memory location, which allows for cryptographic operation when the broker 260 is down or offline and the virtual delivery appliance 253 is not registered. Upon initialization, the crypto service 283 may read with elevated privilege (e.g. Local System) from the virtual delivery appliance registry 292 the RoT 257 public key, and the CLIS 258 and virtual delivery appliance 253 public keys signed by the RoT, as well as the virtual delivery appliance 253 private key to allow for signed responses when the broker 260 is down and the virtual delivery appliance is not registered, as shown in the "allow" row of table 310 for a broker outage (which will be discussed further below). When the broker agent 284 initializes, the virtual delivery appliance 253 UUID and broker 260 signed "allow" are read from the virtual delivery appliance registry 292, and the virtual delivery appliance registration is performed by communicating the virtual delivery appliance UUID from the broker agent 284 to the broker 260 to complete the registration process.

Figure 10A:
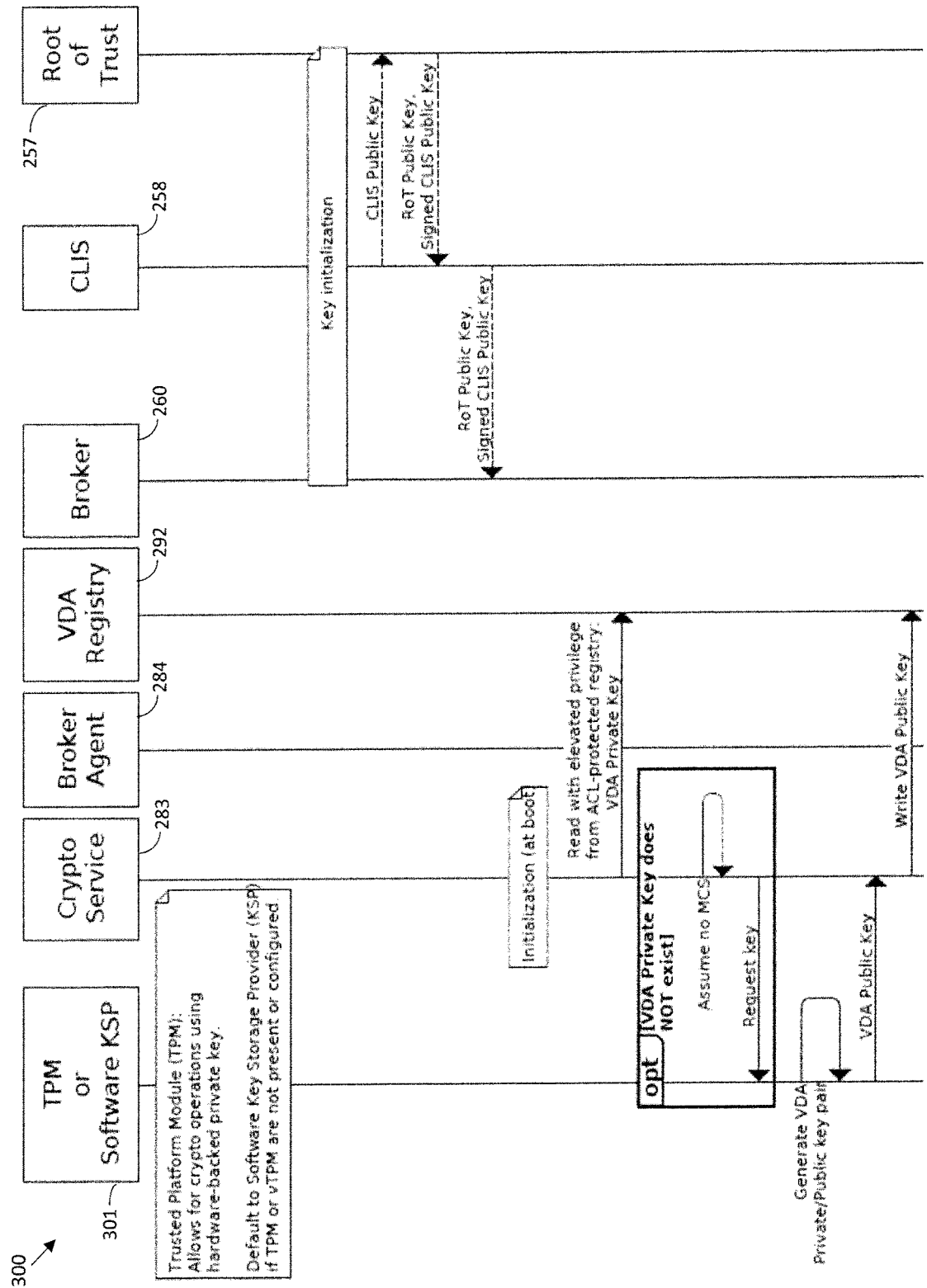
FIGS. 10A-10B are a sequence diagram of another virtual delivery appliance-broker registration sequence that may be performed within the system of FIG. 7 in an example embodiment.
Figure 10B:
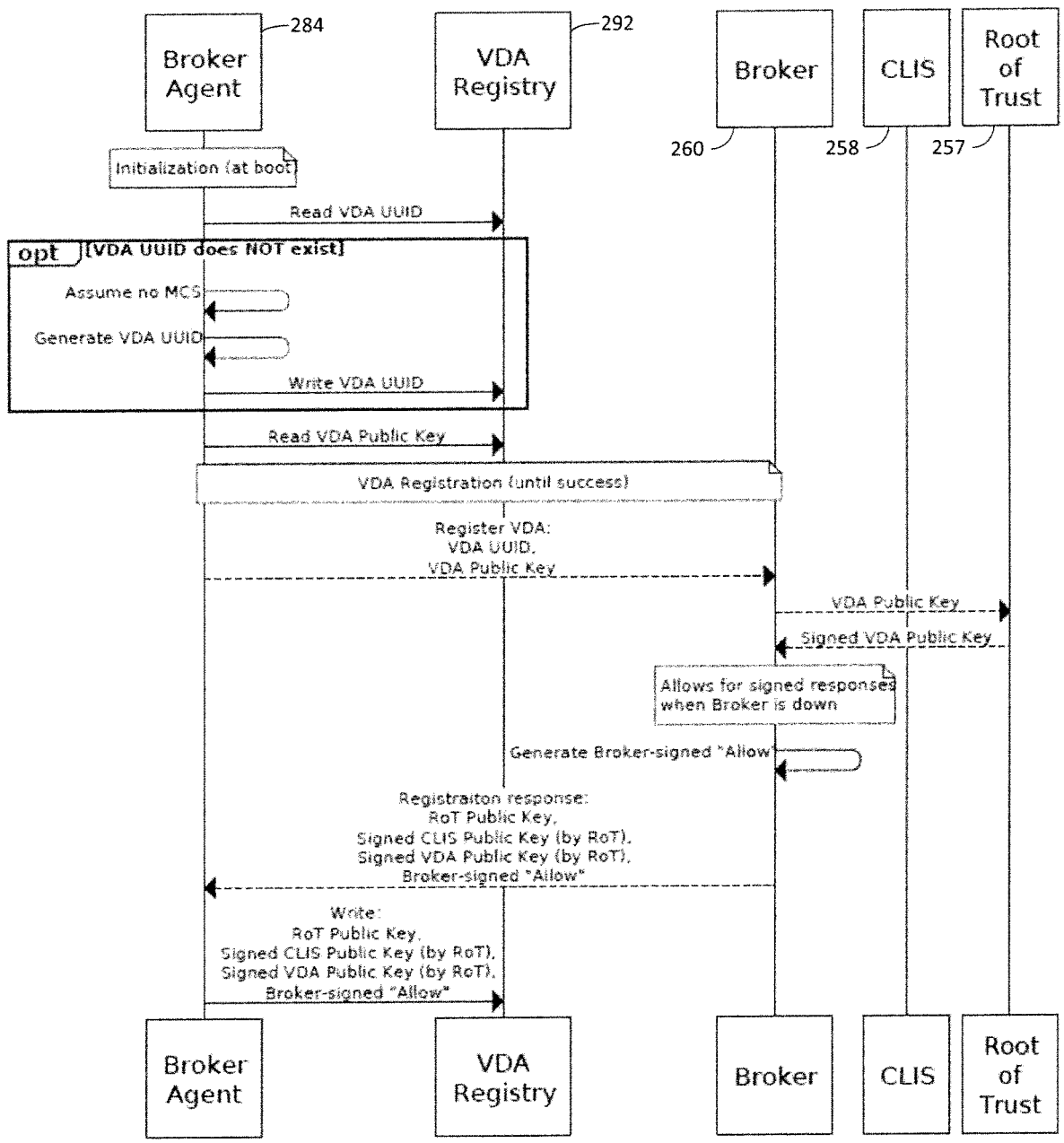

Another example virtual delivery appliance 253 to broker 260 registration sequence, e.g., using a Trusted Platform Module (TPM) or software key storage provider (KSP) 301, is now described with reference to the sequence diagram 300 of FIGS. 10A-10B. A key initialization sequence is first performed between the broker 260, CLIS 258, and RoT 257 as discussed above. Upon initialization, the crypto service 283 may read with elevated privilege (e.g. Local System) from the virtual delivery appliance registry 292 the virtual delivery appliance 253 private key. If this key does not exist, the TPM 301 may first generate the virtual delivery appliance 253 public/private key pair and provide the public key to the crypto service 283. The crypto service 283 may then store the public key in the virtual delivery appliance registry 292. If the virtual delivery appliance 253 UUID already exists, the broker agent 284 reads it from the virtual delivery appliance registry 292 (otherwise the broker agent 284 will generate it and then store it in the virtual delivery appliance registry 292). The broker agent 284 also reads the virtual delivery appliance 253 public key from the virtual delivery appliance registry 292. The virtual delivery appliance 253 registration may then be performed by providing the virtual delivery appliance 253 UUID and public key from the broker agent 284 to the broker 260. The broker 260 has the virtual delivery appliance 253 public key signed by the RoT 257. The broker 260 then generates a broker-signed "allow" to allow for signed responses by the virtual delivery appliance 253 when the broker 260 is down. The broker 260 then provides the registration response to the broker agent 284, which then writes the RoT 257 public key, CLIS 258 and virtual delivery appliance 253 public keys signed by the RoT 257, and the broker-signed "allow" to the virtual delivery appliance registry 292.

As a result of the above described virtual delivery appliance 253 registration sequences, when the broker 260 is offline, the virtual delivery appliances may still advantageously provide secure virtual session access with the broker agent 284 taking over as temporary or substitute broker. As noted above, table 310 summarizes example session validation results for the various broker 260 online and outage modes, which includes a signed "allow", signed "deny", signed "redirect-target", and "soft deny". With respect to security, this configuration advantageously helps avoid being redirected to a "malicious" virtual delivery appliance 253, because, as described above, both the "allow" (accept connection at this virtual delivery appliance) and "redirect-target" (redirect to a different target virtual delivery appliance) responses are signed, thereby allowing the client device 252 and/or the gateway 263 to validate the response before trusting the connection.

Moreover, this configuration also helps to avoid a compromised virtual delivery appliance 253 from luring a user and stealing his or her credentials (e.g., the above-described pooled virtual delivery appliance with admin access). More specifically, for a pooled virtual delivery appliance 253 configuration, a stored pre-signed allow permits the broker agent 284 to accept the first (single) user connection, for example, and thereafter the pre-signed allow may be removed automatically from the broker agent. Thus, session request validations do not-immediately cease based upon a short-lived broker outage, yet if the outage persists then further client devices 252 will not be permitted to use the virtual delivery appliance 253, avoiding the potential that their associated user credentials be stolen as described above.

The example configuration also advantageously helps provide enhanced resiliency in both offline and online broker 260 modes. More particularly, in an offline mode, the use of a "soft deny" by the virtual delivery appliance 253 helps protect against clock drifting or other virtual delivery appliance failures like key expiration/rotation and connection lease signature validation failures. That is, the soft deny implicitly redirects the client device 252 to a different virtual delivery appliance 253 via the above-described connection lease mechanism, so that if a first virtual delivery appliance is unable to validate a connection lease due to clock drift, etc., the client device 252 may still be implicitly redirected to another virtual delivery appliance, already listed in the client's connection lease resource locations, that can properly validate the connection lease so that the client device will not experience a lack of service. In other words, after receiving a "soft deny", the client device 252 (e.g. for direct connections to a virtual delivery appliance) and/or the gateway 263 (e.g. for gateway connections) will choose a next virtual delivery appliance listed in the connection lease resource locations, and attempt connection to it instead. This connection process of choosing a next available virtual delivery appliance may also be referred to as "fan-out". To this end, the broker agent 284 does not deny requests (as the broker 260 can), but instead utilizes a "soft deny".

In an online mode, a "redirect-target" may similarly allow for redirection to an available virtual delivery appliance 253 outside of current connection lease resource locations, e.g., as a result of power-management issues or a pooled VDA already in use, and again help prevent a client device 252 from experiencing a drop in service because of localized problems at a particular virtual delivery appliance(s) in its connection lease. With respect to performance with "redirect-target" (which implies the broker 260 is online), this approach not only avoids the connection lease "fan-out" approach to provide better connection speed, it also allows for session sharing with a previously launched different application, for example. Moreover, user experience with "redirect-target" (online broker 260 mode) allows a user to reconnect with an existing session, as opposed to getting a new session and not reusing work. For example, without utilizing "redirect-target", the choices of virtual delivery appliance to connect to may be limited to those already listed in the connection lease resource locations and in the specified order of selection. In a possible scenario, a user of client device 252 might have been initially connected to a first virtual delivery appliance and started an application or desktop session. This first virtual delivery appliance may not necessarily have been the first choice in the connection lease resource location order, e.g. if the first-choice virtual delivery appliance was unavailable or overloaded at the time. At a later time, the user might attempt to reconnect to their existing session on the first virtual delivery appliance. Strictly following connection lease resource locations order would connect the user of client device 252 to the first-choice virtual delivery appliance, assuming it is now available, thus assigning the user to a new session, instead of reusing work. "Redirect-target" solves the problem by redirecting the user to the virtual delivery appliance already hosting their session, even though it may not have been the first choice prescribed in the connection lease resource locations.

In an example implementation, session results may be validated using a "mini" connection lease. For example, the mini connection lease may be a JSON containing "connectionDetails" that is used in "redirectTarget". An example JSON mini connection lease script is set forth below:

```
{
    "validateSessionResult": {
        "status": "allow, deny, softDeny, redirectTarget",
        "reason": "empty, clInvalid, clExpired, clRevoked",
        "connectionDetails": {
            "address": "10.1.2.2",
            "port": "2598",
            "protocol": "TCP"
        },
        "signature": {
            "signingEntity": "XD Broker",
            "date": "2018-10-03T03:16:56.6808507Z",
            "alg": null,
            "kid": "Unique identifier of the key used to sign",
            "value": "Encrypted with XD Broker private key (hash(key))"
        }
    }
}
```

In another example embodiment, the broker 260 public key is not included in the connection leases. Rather, the broker 260 public key is signed by the RoT 257 private key. Then, along with each signed validation object (validate- SessionResult), the broker 260 also returns its broker public key signed by the RoT 257 private key. The client 252 and/or gateway 263 trust the RoT 257 public key. Therefore, the client 252 and/or gateway 263 can validate the signature of the broker 260 public key using the RoT 257 public key. Now the broker 260 public key is trusted, without having to include it in the connection lease. The validation object may then be validated or authenticated using the broker 260 public key.

Various connection approaches may be used between the client device 252 and the virtual delivery appliance 253. Where there is a direct connection between the client device 252 and the virtual delivery appliance 253 (no gateway 263), validateSessionResult may be sent from the virtual delivery appliance 253 to the client device 252, and the client device performs the validation. Where a gateway 263 is present, validateSessionResult is first sent from the virtual delivery appliance 253 to the gateway, and the gateway validates it. Then, depending on the type of result (e.g., allow, deny, etc.), it may be relayed to the client device 252. In one example implementation, soft denies and redirect-targets are handled by the gateway 263 and not relayed to the client 252. The validateSessionResult may then also be sent from the gateway 263 to the client device 252 so that the client device may validate it as well.

Figure 12:
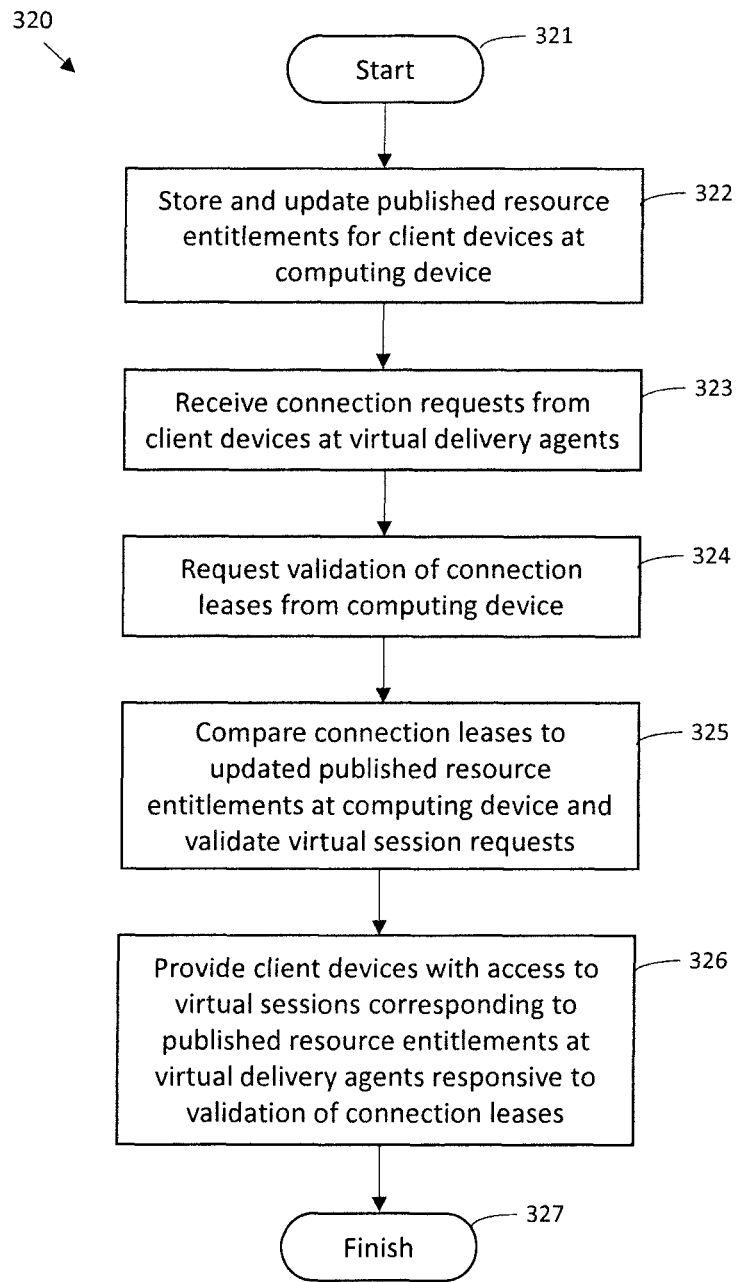
FIGS. 12 and 13 are flow diagrams illustrating method aspects associated with the system of FIG. 6.

Further method aspects will now be described with respect to the flow diagram 320 of FIG. 12. Beginning at Block 321, the method begins with storing and updating published resource entitlements for client devices 203a-203n at the computing device 201, and using virtual delivery appliances 204a-204n to receive connection requests from the client devices 203a-203n, at Blocks 322-323. As noted above, the connection requests include a connection lease issued based upon the published resource entitlements 202 for the client devices 203a-203n, and the virtual delivery appliances 204a-204n request validation of the connection leases from the computing device 201 (Block 324). The method further illustratively includes, at the computing device 201, responsive to validation requests from the virtual delivery appliances 204a-204n, comparing the connection leases to the updated published resource entitlements 202 and validating the virtual session requests based thereon, at Block 325. The method also illustratively includes, at the virtual delivery appliances 204a-204n, providing the client devices 203a-203n with access to virtual sessions corresponding to the published resource entitlements 202 responsive to validation of the connection leases from the computing device 201, at Block 326, which illustratively concludes the method of FIG. 12 (Block 327).

Figure 13:
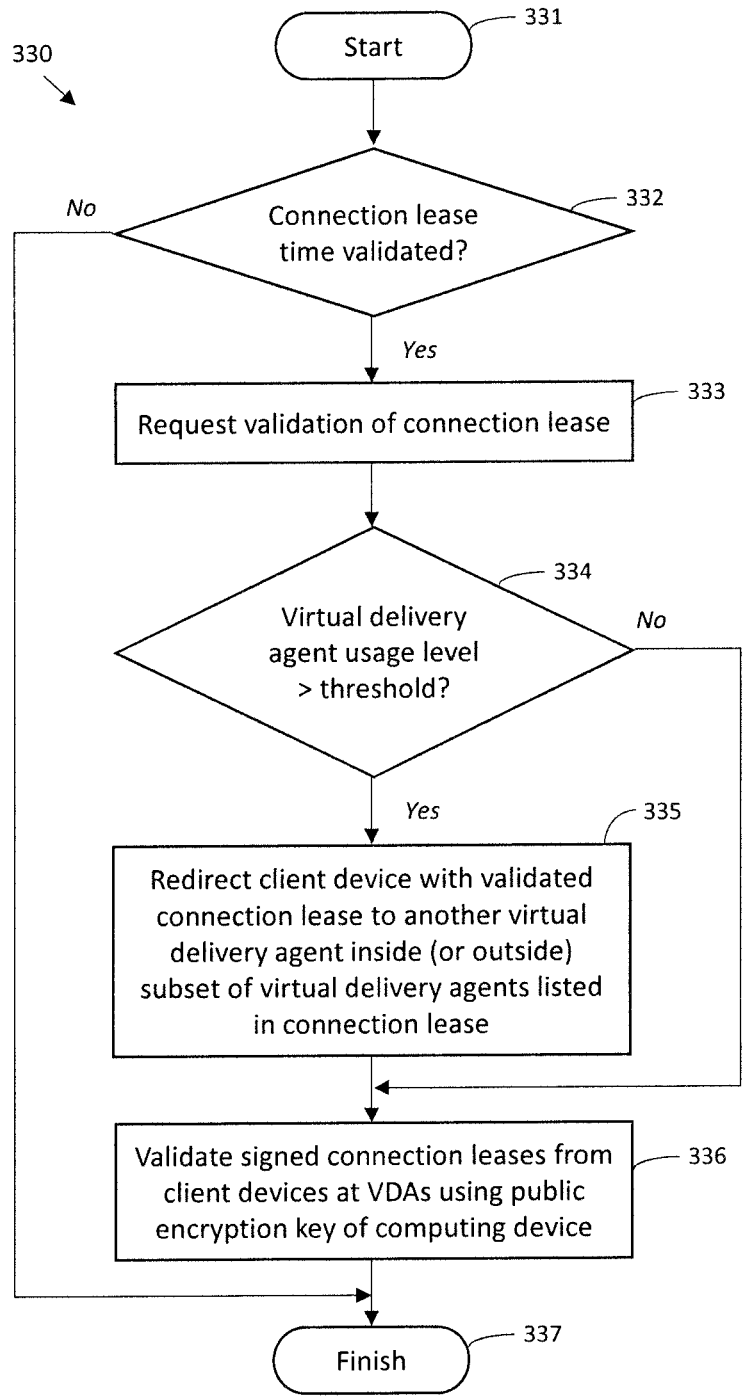

Additional method aspects are also shown in the flow diagram 330 of FIG. 13. Beginning at Block 331, as noted above, the connection leases may also be time-based, and the virtual delivery appliances 204a-204n may further perform time-based validation of the connection leases prior to requesting validation of the connection leases from the computing device 201, at Blocks 332-333, for example. That is, the connection leases are issued for a certain period of time and are not valid for use outside of this time unless renewed or reissued. As also noted above, the connection leases may list a subset of the virtual delivery appliances 204a-204n assigned to a respective client device 203a-203n, and the computing device 201 may redirect client devices with validated connection leases to virtual delivery appliances either inside or outside of the listed subset of virtual delivery appliances based upon virtual delivery appliance usage levels (e.g., exceeding a usage threshold), at Blocks 334-335. Moreover, the connection leases may be signed using the private encryption key of the computing device 201, and the virtual delivery appliances may validate the connection leases using the public encryption key of the computing device prior to requesting validation of the connection leases from the computing device (Block 336), as also discussed further above. The method of FIG. 13 illustratively concludes at Block 337.

As will be appreciated by one of skill in the art upon reading the foregoing disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A method comprising:
    storing and updating published resource entitlements for a plurality of client devices at a computing device, the computing device having a public/private key pair associated therewith;
    using a plurality of virtual delivery appliances to
        receive connection requests from the client devices, the connection requests including a connection lease issued based upon the published resource entitlements for the client devices, and
        request validation of the connection leases from the computing device;
    at the computing device, responsive to validation requests from the virtual delivery appliances, comparing the connection leases to the updated published resource entitlements, validating the virtual session requests based thereon, and providing a copy of the public key of the computing device signed by a private key of a Root of Trust (RoT) along with virtual session request validations to the virtual delivery appliances; and
    at the virtual delivery appliances, providing the client devices with access to virtual sessions corresponding to the published resource entitlements responsive to the virtual session request validations and the signed public key from the computing device.

2. The method of claim 1 further comprising, at the computing device, generating a pre-authorized validation for the virtual delivery appliances; and at the virtual delivery appliances, providing at least one client device with access to a requested virtual session without availability of the computing device based upon the pre-authorized validation.

3. The method of claim 2 wherein the virtual delivery appliances are arranged in a pool, and further comprising at a given virtual delivery appliance in the pool ceasing providing other client devices access to virtual sessions without availability of the computing device after providing the at least one client device with access to the requested virtual session.

4. The method of claim 3 further comprising re-provisioning the given virtual delivery appliance to generate the pre-authorized validation after the requested virtual session is closed.

5. The method of claim 1 further comprising, at the virtual delivery appliances, denying and redirecting the connection requests to other virtual delivery appliances without availability of the computing device.

6. The method of claim 1 wherein the connection leases list a subset of the plurality of virtual delivery appliances; and further comprising, at the computing device, redirecting client devices with validated connection leases to virtual delivery appliances either inside or outside of the listed subset of virtual delivery appliances based upon virtual delivery appliance usage levels.

7. The method of claim 1 wherein the connection leases are being associated with a public/private encryption key pair of the computing device and signed using the private encryption key; and further comprising, at the virtual delivery appliances, validating the connection leases using the public encryption key prior to requesting validation of the connection leases from the computing device.

8. The method of claim 7 wherein the connection leases are also time-based, and further comprising, at the virtual delivery appliances, performing time-based validation of the connection leases prior to requesting validation of the connection leases from the computing device.

9. The method of claim 1 further comprising, at a gateway device:
  authenticating the signed public key of the computing device using a public key of the RoT;
  authenticating the virtual session request validations using the authenticated public key of the computing device; and
  establishing session connections between the client devices and the virtual delivery appliances responsive to authenticating the virtual session request validations.

10. The method of claim 1 further comprising, at the client devices:
  authenticating the signed public key of the computing device using a public key of the RoT;
  authenticating the virtual session request validations using the authenticated public key of the computing device; and
  establishing session connections with the virtual delivery appliances responsive to authenticating the virtual session request validations.

11. A virtual delivery appliance comprising:
  a memory and a processor configured to cooperate with the memory to
    receive connection requests from a plurality of client devices, the connection requests including a connection lease issued based upon published resource entitlements for the client devices stored and updated at a computing device, the computing device having a public/private key pair associated therewith,
    request validation of the connection leases to cause the computing device to compare the connection leases to the updated published resource entitlements and validate the virtual session requests based thereon, and
    provide the client devices with access to virtual sessions corresponding to the published resource entitlements responsive to receiving a copy of the public key of the computing device signed by a private key of a Root of Trust (RoT) and virtual session request validations from the computing device.

12. The virtual delivery appliance of claim 11 wherein the computing device is configured to generate a pre-authorized validation for the computing device; and wherein the processor is further configured to provide at least one client device with access to a requested virtual session without availability of the computing device based upon the pre-authorized validation.

13. The virtual delivery appliance of claim 11 wherein processor is further configured to deny and redirect the connection requests to another virtual delivery appliance without availability of the computing device.

14. The virtual delivery appliance of claim 11 wherein the connection leases are being associated with a public/private encryption key pair and signed using the private encryption key; and wherein the processor is configured to validate the connection leases using the public encryption key prior to requesting validation of the connection leases from the computing device.

15. A computing system comprising:
  a computing device configured to store and update published resource entitlements for a plurality of client devices, the computing device having a public/private key pair associated therewith; and
  a plurality of virtual delivery appliances configured to
    receive connection requests from the client devices, the connection requests including a connection lease issued based upon the published resource entitlements for the client devices,
    request validation of the connection leases from the computing device, and
    provide the client devices with access to virtual sessions corresponding to the published resource entitlements responsive to validation of connection leases from the computing device;
  wherein the computing device, responsive to validation requests from the virtual delivery appliances, compares the connection leases to the updated published resource entitlements, validates virtual session requests based thereon, and provides a copy of the public key of the computing device signed by a private key of a Root of Trust (RoT) along with virtual session request validations to the virtual delivery appliances.

16. The computing system of claim 15 wherein the computing device is further configured to generate a pre-authorized validation for the virtual delivery appliances; and wherein the virtual delivery appliances are configured to provide at least one client device with access to a requested virtual session without availability of the computing device based upon the pre-authorized validation.

17. The computing system of claim 15 wherein the virtual delivery appliances are further configured to deny and redirect the connection requests to other virtual delivery appliances without availability of the computing device.

18. The computing system of claim 15 wherein the connection leases list a subset of the plurality of virtual delivery appliances; and wherein the computing device is further configured to redirect client devices with validated connection leases to virtual delivery appliances either inside or outside of the listed subset of virtual delivery appliances based upon virtual delivery appliance usage levels.

* * * * *